US007418336B2

(12) United States Patent
Matekunas et al.

(10) Patent No.: US 7,418,336 B2
(45) Date of Patent: Aug. 26, 2008

(54) METHOD FOR INTERNAL COMBUSTION ENGINE CONTROL USING PRESSURE RATIOS

(75) Inventors: Frederic Anton Matekunas, Troy, MI (US); Paul Anthony Battiston, Clinton Township, MI (US); Patrick G. Szymkowicz, Shelby Township, MI (US); Anupam Gangopadhyay, Troy, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/739,212

(22) Filed: Apr. 24, 2007

(65) Prior Publication Data

US 2007/0245818 A1 Oct. 25, 2007

Related U.S. Application Data

(60) Provisional application No. 60/794,411, filed on Apr. 24, 2006.

(51) Int. Cl.
*F02M 7/00* (2006.01)
*G06F 17/00* (2006.01)
*G01L 23/22* (2006.01)

(52) U.S. Cl. .................. 701/103; 701/114; 123/299; 123/435; 73/118.1

(58) Field of Classification Search .................. 701/103, 701/104, 114, 102, 110; 123/435, 299, 478; 73/35.08, 118.1
See application file for complete search history.

(56) References Cited

U.S. PATENT DOCUMENTS

| 4,621,603 | A | 11/1986 | Matekunas |
| 4,622,939 | A | 11/1986 | Matekunas |
| 4,624,229 | A | 11/1986 | Matekunas |
| 4,940,033 | A * | 7/1990 | Plee et al. .................. 123/435 |
| 5,038,737 | A | 8/1991 | Nishiyama et al. |
| 5,450,829 | A | 9/1995 | Beck |
| 6,376,927 | B1 | 4/2002 | Tamai et al. |
| 6,411,038 | B2 | 6/2002 | Murai et al. |
| 6,659,073 | B1 | 12/2003 | Franke et al. |
| 7,146,964 | B2 * | 12/2006 | Norimoto et al. ........... 123/435 |
| 2005/0187700 | A1 | 8/2005 | Jacobson |
| 2005/0251322 | A1 | 11/2005 | Wang et al. |
| 2007/0250255 | A1 * | 10/2007 | Matekunas et al. .......... 701/104 |

FOREIGN PATENT DOCUMENTS

JP 2005-61239 A * 3/2005

OTHER PUBLICATIONS

Sellnau,M;Cyl. Pressure-Based Engine Control using Pressure Ratio Management;SAE 2000-01-0932; 2000;Soc.Auto.Engrg; Warrendale, PA, USA.

* cited by examiner

*Primary Examiner*—Hieu T. Vo

(57) ABSTRACT

The invention comprises a method to operate a direct-injection engine operative at various air/fuel ratios. The method comprises monitoring in-cylinder pressure, along with a corresponding engine crank position to periodically to determine instantaneous in-cylinder pressure states corresponding to the engine crank position during compression and expansion. Pressure ratios are determined based upon the instantaneous in-cylinder pressure states. A combustion heat release is determined based upon the pressure ratios. An aspect of the invention comprises extending the operation to diesel, diesel premixed and to HCCI engines.

20 Claims, 3 Drawing Sheets

METHOD FOR INTERNAL COMBUSTION ENGINE CONTROL USING PRESSURE RATIOS

CROSS REFERENCE TO RELATED APPLICATIONS

This application claims priority from U.S. Provisional Application No. 60/794,411, filed Apr. 24, 2006, entitled ENGINE CONTROL.

TECHNICAL FIELD

This invention relates to operation and control of internal combustion engines, including compression-ignition engines.

BACKGROUND OF THE INVENTION

The statements in this section merely provide background information related to the present disclosure and may not constitute prior art.

A variety of intrusive and non-intrusive pressure sensing means are known for sensing pressure within an internal combustion engine cylinder when the engine is motoring and when the engine is firing.

Various aspects of internal combustion engine controls are known which rely on in-cylinder pressure measurements, particularly location of peak pressure (LPP), indicated mean effective pressure (IMEP) calibration and absolute peak pressure.

Known pressure ratio management (PRM) methods provide timing and cylinder charge control using constant property assumptions applicable to operating ranges of conventional spark ignited engines. The methods as relate to conventional spark ignited engines are based on constant property assumptions and computations of the ratio of fired to motored pressure during each engine cycle. From this, combustion timing can be estimated along with a parameter related to cylinder charge strength.

Compression-ignition engines and other engine control schemes operate over broad engine conditions, and effective control, including fuel control, fuel tailoring, charge ignition timing control, exhaust gas recirculation (EGR) control, is necessary to meet operator demands for performance and fuel economy and comply with emissions requirements. Furthermore, there is much variability, including that related to: components, e.g., fuel injectors; systems, e.g., fuel line and pressures; operating conditions, e.g., ambient pressures and temperatures; and, fuels, e.g., cetane number and alcohol content. The variability affects heat release and work output from individual cylinders, resulting in non-optimal performance of the engine. Any change in the engine performance is apparent in cylinder pressure ratios.

Referring now to FIG. 1, there is provided a graphical depiction of measured cylinder pressure ratio plotted based upon crank angle for varying operating conditions, specifically air/fuel ratios. The pressure ratio after expansion depends upon the work removed and heat loss of the engine. The graph indicates that engine operating conditions affect engine combustion and heat release, which can be indicated by a cylinder pressure ratio. The pressure ratio immediately after a heat release depends upon temperature and fuel/air equivalence ratio, phi, whereas the pressure ratio determined after expansion depends upon the work removed during expansion and heat loss through cylinder walls. An accurate and effective method to determine pressure ratio in an individual cylinder may be useable by an engine control system to improve engine control over a wide range of cylinder charge temperatures and compositions that can be found in operation of HCCI and diesel engines.

What is described herein comprises a method to monitor engine operation to determine engine heat release and combustion phasing, especially adapted for varying operating conditions that are related to compression ignition engines and homogeneous charge compression ignition (HCCI) engines having a wide range of cylinder charge temperatures and compositions.

SUMMARY OF THE INVENTION

In accordance with an embodiment of the invention, there is provided a method and system to operate an internal combustion engine, said engine comprising a multi-cylinder direct-injection engine operative lean of stoichiometry wherein each cylinder includes a variable volume combustion chamber defined by a piston reciprocating therein between top-dead-center and bottom-dead-center points and a cylinder head. The piston reciprocates in repetitive cycles with each cycle comprising intake, compression, expansion, and exhaust strokes. The method includes adapting a plurality of pressure sensing devices to monitor in-cylinder pressure during ongoing engine operation. In-cylinder pressure is monitored along with a corresponding engine crank position to periodically to determine instantaneous in-cylinder pressure states corresponding to the engine crank position during the compression and expansion strokes. Pressure ratios are determined based upon the instantaneous in-cylinder pressure states. A combustion heat release is determined based upon the plurality of pressure ratios. The invention applies to diesel, diesel premixed and to HCCI engine operation.

BRIEF DESCRIPTION OF THE DRAWINGS

The invention may take physical form in certain parts and arrangement of parts, the embodiments of which are described in detail and illustrated in the accompanying drawings which form a part hereof, and wherein.

DESCRIPTION OF THE PREFERRED EMBODIMENT

Figure 1:
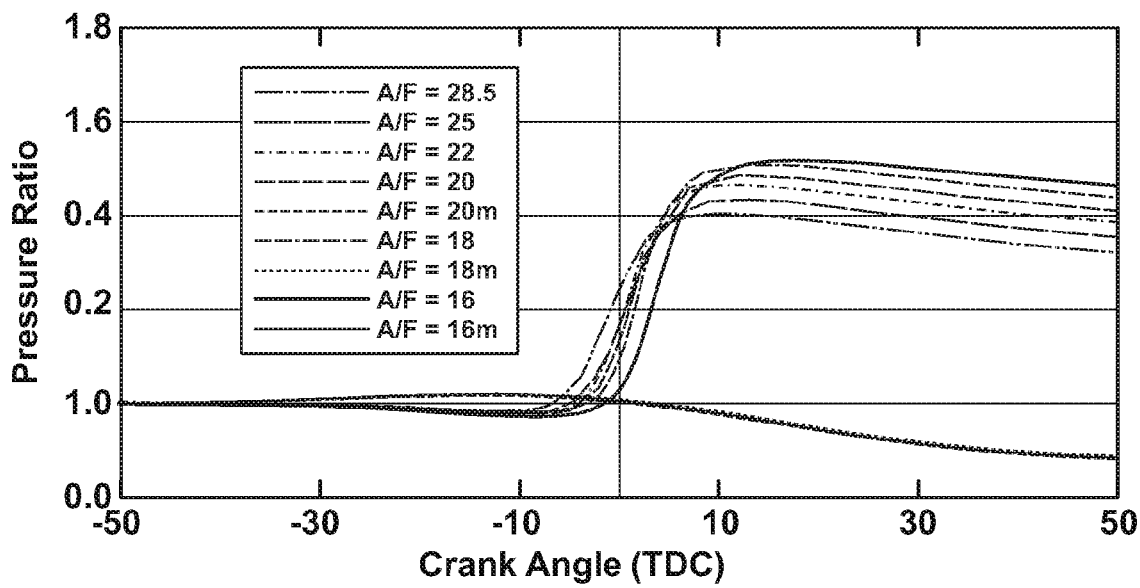
FIGS. 1-4 are data graphs, in accordance with the present invention.

The invention described herein comprises a method to ongoingly monitor operation and determine combustion parameters, including combustion phasing and heat release of a multi-cylinder internal combustion engine. The engine is adapted to operate over a broad range of temperatures, cylinder charge (air, fuel, and, EGR) and injection events. The method is particularly suited to operation with direct-injection compression-ignition engines operating lean of stoichiometry to determine parameters which correlate to heat release in each of the combustion chambers during ongoing operation. The method is further applicable to other engine configurations, including spark-ignition engines, including those adapted to use homogeneous charge compression ignition (HCCI) strategies. The method is applicable to systems utilizing multiple fuel injection events per cylinder per engine cycle, e.g., a system employing a pilot injection for fuel reforming, a main injection event for engine power, and, where applicable, a post-combustion fuel injection event for aftertreatment management, each which affects cylinder pressure.

In the invention, the engine preferably comprises a direct-injection, four-stroke, internal combustion engine including a variable volume combustion chamber defined by the piston reciprocating within the cylinder between top-dead-center and bottom-dead-center points and a cylinder head comprising an intake valve and an exhaust valve. The piston reciprocates in repetitive cycles each cycle comprising intake, compression, expansion, and exhaust strokes. Pressure sensing devices, preferably low-cost sensors not requiring detailed calibration, zeroing, and trimming, are installed in the engine to monitor in-cylinder pressure in each of the cylinders during ongoing operation. Exemplary sensors are described hereinafter. In operation, in-cylinder pressures are monitored along with a corresponding engine crank position to determine instantaneous in-cylinder pressure states corresponding to the engine crank position, especially of interest during the compression and expansion strokes. Pressure ratios are calculated based upon the instantaneous in-cylinder pressure states, preferably at each measurement of cylinder pressure.

The method comprises deriving a pressure-ratio management (PR) term that is property-dependent for use in engine management and control. The properties are temperature-dependent and cylinder charge-dependent. The PR term is applicable to engine control for accurate fueling estimation during multiple injections per combustion event, as it periodically determines PR throughout each combustion cycle. The PR provides an estimate of the amounts of fuel burnt during individual pilot, main and post combustion fuel injection events. Less sampling resolution is required for PR because its computation is performed for predefined crank angles, corresponding to inputs from a crank sensor. The PR term can be used to control combustion phasing for pilot injection, main combustion, and post-combustion injections. Parameters related to combustion heat release and combustion phasing are determined for each cycle for each cylinder based upon the calculated pressure ratios.

The method monitors signal samples during compression and assumes a polytropic compression to generate a reference for floating pressure signal level. Polytropic compression may be expressed as follows:

$$PV^n = \text{CONSTANT}$$

For the PRM technique an ideal motoring pressure is computed through the cycle. Ideal motoring assumes that n is constant and there is no heat loss.

There are two elements to determining the PR term constant volume heat addition and adiabatic polytropic expansion. Both derivations start with the first law of thermodynamics. The general form of the first law of thermodynamics for a closed system, e.g., a combustion chamber as depicted with reference to FIG. 1, is Eq. (1):

$$dU = \delta Q_{ch} - \delta Q_{ht} - \delta W \tag{1}$$

wherein dU is the internal energy change in the system (Eq. (2)); W is the work done by the gas on the piston (Eq. (3)) and Qch and Qht are the heat addition by fuel and the heat transfer out from the system, respectively (Eq. (2-3)). Crevice and blow-by flows are neglected in the current derivation.

$$dU = mc_v dT \tag{2}$$

$$W = PdV \tag{3}$$

$$\delta Q_{ch} = LHV \times dm_f = LHV \times m_f d(mbf) \tag{4}$$

$$\delta Q_{ht} = Ah(T_g - T_w) = LHV \times m_f d(qwf) \tag{5}$$

wherein m is the total mass within the system boundary, cv is the constant volume specific heat, P is the cylinder pressure, LHV is the lower heating value of a fuel, A is the exposed combustion chamber surface area, h is the heat transfer coefficient, Tg is the mean gas temperature, Tw is the cylinder wall temperature, and qwf is the wall heat transfer fraction of fuel energy.

Figure 2:
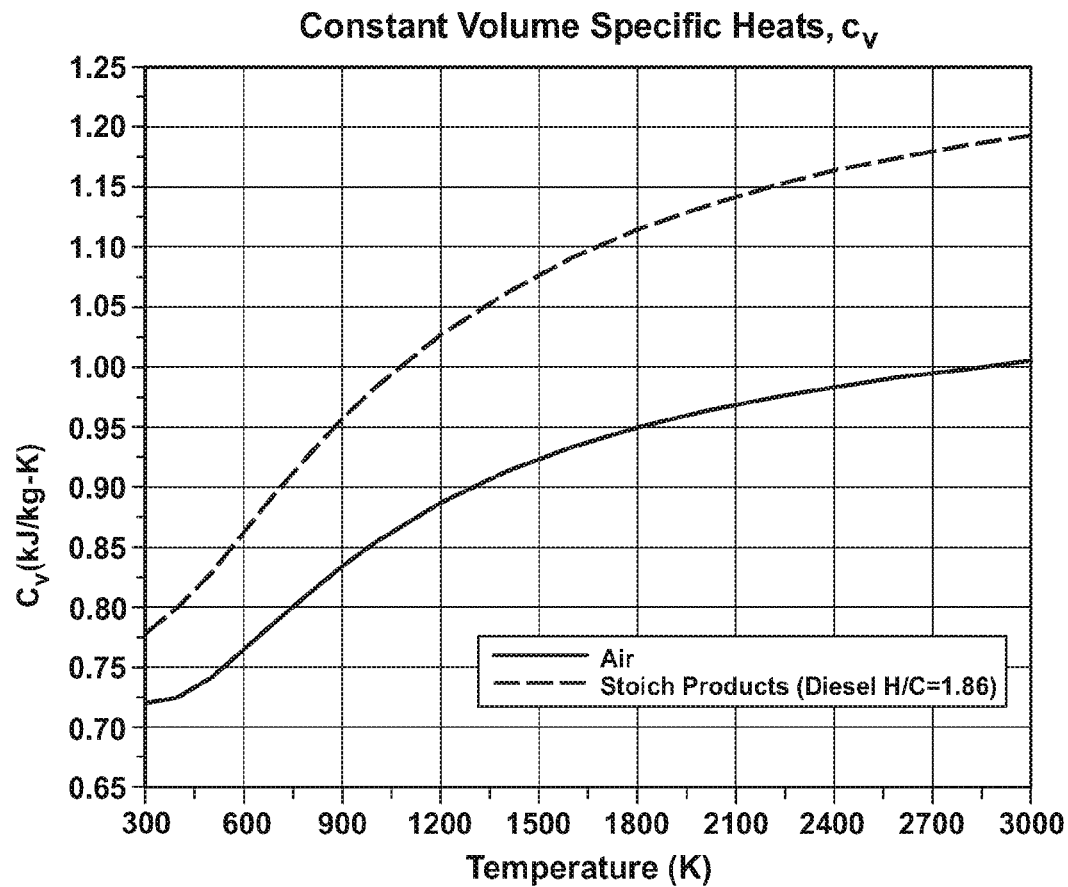

The analytical solution for deriving the PRM term for non-constant properties is as follows. In the typical internal combustion engine system, the constant volume specific heat, $c_v$, is temperature and property-dependent. The constant volume specific heat is defined in two regions: compression-temperature range (Eq. (6)) and flame-temperature range (Eq. (7)).

$$c_{vi}(T_i, \phi) = c_{vinit} + b1 \times (T_i - T_{iref}) \tag{6}$$

$$c_v(T, \phi) = c_{vref} + b \times (T - T_{ref}) \tag{7}$$

where subscript 'i' refers to initial conditions and subscript 'ref' refers to the reference conditions. Referring now to FIG. 2 there is depicted constant volume specific heats of air and diesel stoichiometric products based upon temperature. The terms b1 and b comprise the slopes determined by interpolation from constant volume specific heats of air and diesel stoichiometric products, respectively. There is a need to differentiate the compression temperature and flame temperature ranges because $C_v$ behaves differently with temperature. That is, $C_v$ does not typically increase in the flame temperature range as steeply or rapidly as in the compression temperature range. For a given fuel/air equivalence ratio, phi ($\phi$), interpolate between the specific heats of air and stoichiometric products, with a weighting of (1−$\phi$) times the air value and $\phi$ times the stoichiometric products to obtain the specific heat and its slope for products of combustion leaner than stoichiometric.

The constant volume heat addition is determined as follows. For a constant volume heat addition system, no work is done on the piston. Thus, Eq. (3) becomes 0 because the volume change is 0. Then, the first law of thermodynamics implies that the change in internal energy must equal any heat flowing into or out of the system. For the combustion system considered, the internal energy change only due to combustion needs to subtract the internal energy change due to compression just before heat addition. Heat transfer is neglected because of the short duration of the event. Internal energy is a state variable; therefore, it depends on only starting and ending states. Then, the first law of thermodynamics for this system can be obtained by substituting Eq. (2-7) into Eq. (1), as follows in Eq. (8):

$$m_{tot}[(c_{vref} + b1 \times (T - T_{ref})) \times T - (c_{vinit} + b1 \times (T_i - T_{iref})) \times T_i] = m \times LHV \tag{8}$$

wherein $m_{tot}$ is the total charge mass in the system and LHV is lower heating value of the fuel. Eq. (8) can be rewritten as Eq. (9):

$$b \times T^2 + [c_{vref} - (b \times T_{ref})] \times T - c_{vi} \times T_i = \frac{m_f \times LHV}{m_{tot}} \quad (9)$$

Dividing by $b \times T_i^2$ on both sides of Eq. (9) yields Eq. (10):

$$\left(\frac{T}{T_i}\right)^2 + \left(\frac{c_{vref}}{b \times T_i} - \frac{T_{ref}}{T_i}\right) \times \left(\frac{T}{T_i}\right) - \frac{c_{vi}}{b \times T_i} = \frac{m_f \times LHV}{m_{tot} \times b \times T_i^2} \quad (10)$$

Constants k, k2, and B are parameters introduced to simplify the derivation. The constants are defined with Tref assuming specific heat data are stored in a table with values at Tref; optionally a functional definition of the properties with temperature simplifies the expressions with Tref=Ti:

$$k = \frac{c_{ref}}{b \times T_i} - \frac{T_{ref}}{T_i}, k2 = \frac{c_{vi}}{b \times T_i}, B = \frac{m_f \times LHV}{m_{tot} \times b \times T_i^2} \quad (11)$$

Then, Eq. (10) becomes a simple quadratic equation and Eq. (11) gives the following solutions in Eq. (13).

$$\left(\frac{T}{T_i}\right)^2 + k \times \left(\frac{T}{T_i}\right) - (k2 + B) = 0 \quad (12)$$

$$\frac{T}{T_i} = \frac{-k \pm \sqrt{k^2 + 4 \times (k2 + B)}}{2} \quad (13)$$

The temperature ratio is a positive value, giving a final solution as depicted in Eq. (14):

$$\frac{T}{T_i} = \frac{-k + \sqrt{k^2 + 4 \times (k2 + B)}}{2} \quad (14)$$

$$= \frac{k}{2} \times \left[-1 + \sqrt{1 + 4 \times (k2 + B)/k^2}\right]$$

With $T_i = T_{iref}$, k2 becomes $k2 = c_{vinit}/(b \times T_i)$.

For the constant volume heat addition, the ideal gas equation of state is used to relate the temperature ratio to the pressure ratio (PR) as follows:

$$V = V_i = \frac{mRT}{P} = \frac{mRT_i}{P_i} \Rightarrow \frac{T}{T_i} = \frac{P}{P_i} \quad (15)$$

Figure 3:
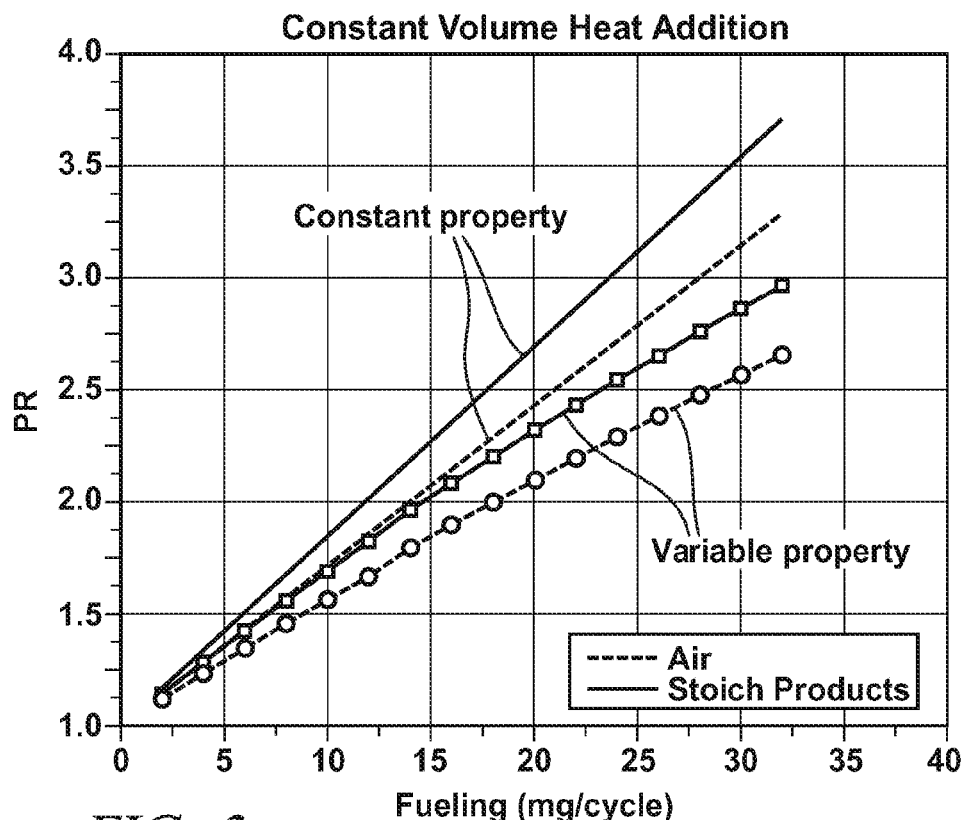

The temperature ratio is the same as the pressure ratio for a constant volume heat addition. Thus the pressure ratio due to constant volume heat addition in which reactants depend on temperature and combustion charge is as follows:

$$\frac{P}{P_i} = PR = \frac{k}{2} \times \left[-1 + \sqrt{1 + 4 \times (k2 + B)/k^2}\right] \quad (16)$$

wherein constants, k, k2, and B, are defined in Eq. (11). The result of Eq. (16) is a pressure ratio between pressure at the end of heat addition and the initial pressure. The pressure ratio is a function of the initial temperature, $T_i$, and cylinder charge. It does not include heat transfer, blow-by flow and humidity effects. Pressure ratios for constant and variable properties are plotted in FIG. 3. The initial temperature used in this plot is 1000 K. The PR for variable property is lower than that for constant property.

The polytropic expansion is determined as follows. It is assumed that the closed system is perfectly insulated, thus, there is no heat transfer. Then, the first law of thermodynamics becomes:

$$dU = -W \quad (17)$$

$$= -PdV \Rightarrow m_{tot}[c_{vref} + b \times (T - T_{ref})]dT$$

$$= -\frac{m_{tot} RT}{V} dV$$

wherein R is the universal gas constant. Rearranging Eq. (17) and applying integration from $T_f$ to T yields:

$$\int_{T_f}^{T} \frac{[c_{vref} + b \times (T - T_{ref})]}{RT} dT = -\int_{V_{init}}^{V} \frac{dV}{V} \quad (18)$$

wherein $T_f$ is the temperature at the end of heat addition and before expansion. Thus, Tf can be obtained from the temperature ratio just derived using a constant volume heat addition. Performing integration and rearranging yields:

$$\frac{(c_{vref} - b \times T_{ref})}{R} \ln\left(\frac{T}{T_f}\right) + \frac{b \times T_f}{R}\left(\frac{T}{T_f} - 1\right) = -\ln\left(\frac{V}{V_{init}}\right) \quad (19)$$

Another constant, k3 is defined using Eq. (20). And, dividing Eq. (19) by k3 gives Eq. (21):

$$k3 = \frac{(c_{vref} - b \times T_{ref})}{R} \quad (20)$$

$$\ln\left(\frac{T}{T_f}\right) + \frac{b \times T_f}{R \times k3}\left(\frac{T}{T_f} - 1\right) = -\frac{1}{k3}\ln\left(\frac{V}{V_{init}}\right) \quad (21)$$

Another constant $$A = \frac{R \times k3}{b \times T_f}$$

is defined thusly. Then, Eq. (21) yields:

$$\ln\left(\frac{T}{T_f}\right) + \frac{1}{A}\left(\frac{T}{T_f} - 1\right) = -\frac{1}{k3}\ln\left(\frac{V}{V_{init}}\right) \quad (22)$$

Knowing that $e^{a+b=c} \Rightarrow e^a e^b = e^c$ and $e^{\ln a} = a$, Eq. (22) becomes:

$$\left(\frac{T}{T_f}\right) \times e^{\frac{1}{A}\left(\frac{T}{T_f} - 1\right)} = \left(\frac{V}{V_{init}}\right)^{-\frac{1}{k3}} = \left(\frac{V_{init}}{V}\right)^{\frac{1}{k3}} \quad (23)$$

The Taylor series for $e^x$ is known to be:

$$e^x = 1 + \frac{x}{1!} + \frac{x^2}{2!} + \frac{x^3}{3!} + \ldots \text{ for } x^2 < \infty.$$

Applying the Taylor series for the second term in Eq. (23) yields:

$$e^{\frac{1}{A}\left(\frac{T}{T_f}-1\right)} = 1 + \frac{\left[\frac{1}{A}\left(\frac{T}{T_f}-1\right)\right]}{1!} + \frac{\left[\frac{1}{A}\left(\frac{T}{T_f}-1\right)\right]^2}{2!} + \ldots \quad (24)$$

$$\text{for } \left[\frac{1}{A}\left(\frac{T}{T_f}-1\right)\right]^2 < \infty$$

The second term on the right hand side in Eq. (24) can be neglected. Then, Eq. (23) becomes:

$$\left(\frac{T}{T_f}\right) \times \left[1 + \frac{1}{A}\left(\frac{T}{T_f}-1\right)\right] = \left(\frac{V_{init}}{V}\right)^{\frac{1}{k3}} \quad (25)$$

Rearranging Eq. (25) gives a simple quadratic equation as depicted in Eq. (26). Solving this equation gives two solutions, depicted in Eq. (27).

$$\left(\frac{T}{T_f}\right)^2 + (A-1)\left(\frac{T}{T_f}\right) - A\left(\frac{V_{init}}{V}\right)^{\frac{1}{k3}} = 0 \quad (26)$$

$$\frac{T}{T_f} = \frac{-(A-1) \pm \sqrt{(A-1)^2 + 4A\left(\frac{V_{init}}{V}\right)^{\frac{1}{k3}}}}{2} \quad (27)$$

Figure 4:
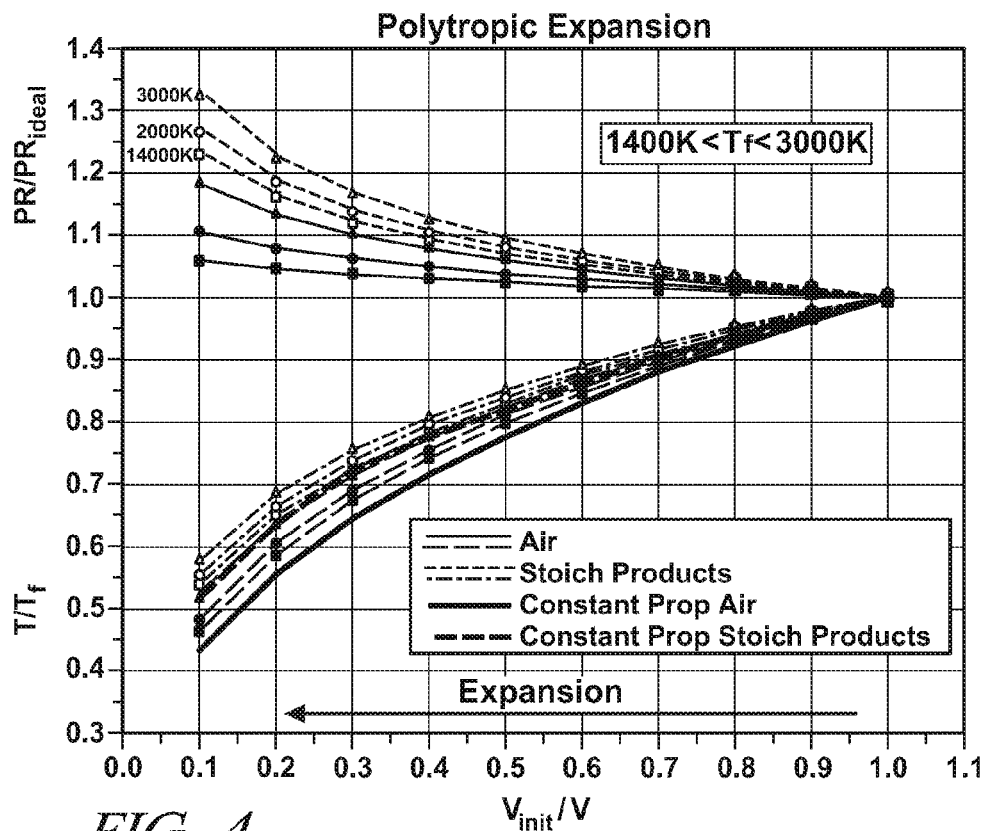

Again, the temperature ratio is a positive value, so rearranging the solution gives the final solution for the temperature ratio for polytropic expansion with variable cylinder charge property. Referring now the bottom portion of FIG. 4 there is depicted the temperature ratios of air and stoichiometric products for constant and variable properties for the temperature ranges from 1400 to 3000 K.

$$\frac{T}{T_f} = \frac{1}{2}\left[(1-A) + \sqrt{(A-1)^2 + 4A\left(\frac{V_{init}}{V}\right)^{\frac{1}{k3}}}\right] \quad (28)$$

The ideal gas equation of state is used to relate the temperature ratio to the pressure ratio. The pressure ratio for variable properties can be obtained as depicted in Eq. (29). The pressure ratio for constant property is obtained using isentropic expansion, as in Eq. (30).

$$P_f = \frac{m_{tot} R T_f}{V_f}, \quad P = \frac{m_{tot} R T}{V} \Rightarrow \frac{P}{P_f} = PR = \left(\frac{T}{T_f}\right)\left(\frac{V_f}{V}\right)$$

$$\frac{P}{P_f} = \frac{1}{2}\left(\frac{V_f}{V}\right)\left[(1-A) + \sqrt{(A-1)^2 + 4A\left(\frac{V_{init}}{V}\right)^{\frac{1}{k3}}}\right] \quad (29)$$

$$P_f V_f^\gamma = P V^\gamma \Rightarrow \frac{P}{P_f} = PR_{ideal} = \left(\frac{V_f}{V}\right)^\gamma \quad (30)$$

The ratio of the variable property PR to the constant property PR is as depicted in Eq. (31).

$$\frac{\left(\frac{P}{P_f}\right)}{\left(\frac{P}{P_f}\right)_{ideal}} = \frac{\left(\frac{T}{T_f}\right)\left(\frac{V_f}{V}\right)}{\left(\frac{V_f}{V}\right)^\gamma} = \frac{\left(\frac{T}{T_f}\right)}{\left(\frac{V_f}{V}\right)^{(\gamma-1)}} \quad (31)$$

The volume ratios can be combined because the volume ratio is not property dependent. Knowing the ratio of these two PR is convenient because it is apparent how much greater the variable property PR is than the constant property PR. Referring now to the top portion of FIG. 4, the ratio of the pressure ratios of air and stoichiometric products for constant and variable properties for the temperature ranges from 1400 to 3000 K are depicted. Using the ratio of two PR, the variable property PR is as follows:

$$PR = \left[\frac{\left(\frac{P}{P_f}\right)}{\left(\frac{P}{P_f}\right)_{ideal}}\right] \times PR_{ideal} = \left(\frac{T}{T_f}\right) \times \left(\frac{V}{V_f}\right)^{(\gamma-1)} \times PR_{ideal} \quad (32)$$

For constant property, gamma, i.e., $\gamma$, comprises a ratio of specific heats and is nominally chosen as that for air at the temperature corresponding to those used for computing the signal bias and without EGR. Thus, nominally or initially $\gamma=1.365$ for diesel engines and nominally $\gamma=1.30$ for conventional gasoline engines. These can however be adjusted based on the data from the specific heats for air and stoichiometric products using an estimate of the equivalence ratio and EGR molar fraction targeted for the operating condition and using the relation that $[\gamma=1+(R/cv)]$ and the weighted average of air and product properties through the expression:

$$Cv(T) = (1.0 - \phi^* EGR)^* Cvair(T) + (\phi^* EGR)^* Cvstoichprod(T)$$

With the expression evaluated at the gas temperature corresponding to that for pressures sampled for the computation of signal bias.

The method described hereinabove is readily reduced to be programmed into a microcontroller or other device for execution during ongoing operation of an internal combustion engine, as follows.

The trapped mass temperature To, at intake valve closing (IVC) is estimated from predetermined calibrations for the operating condition and the motored temperature, Tmot, using the polytropic expression with the gamma value used as that described, as in Eq. 33:

$$Tmot(CA) = To(Vo/V(CA))(\gamma-1) \quad (33)$$

Using the conventionally computed pressure ratio at measured crank angles (CA) an estimate of the mean gas temperature is computed using the following equation:

$$T(CA) = Tmot(CA)^* PR(CA) \quad (34)$$

Progressively the combustion heat release, i.e., the net heat addition/unit mass, is determined from equation (16) above using the solution of Eq. 16 for B with the property and temperature dependent (k and k2) and the expression in Eq.28 to provide an initial temperature from which the heat of combustion is added. Specifically, T(CAi) of Eq. 34 is used to compute the polytropic expansion temperature with Eq. 28 for the next sample point with Tf=T(CAi) and the solution T, i.e., "Texp", which is the temperature the gases achieve when expanded from the previous sample without heat addition. The ratio of T(CAi+1) to this computed Texp provides a new PR for the computation of incremental heat addition B(CAi+1), using Eq. 16 with properties evaluated at Texp. The term B reflects the net heat addition which is converted to a mass of fuel burned over the interval using the definitions in Eq. 10 (Ti=Texp) and a correlation of the wall heat transfer as a fraction of the heat release over the interval. This correlation is developed from the base engine calibration. The resulting fuel burned distribution/mass of charge provides the base information to direct the timing of injections as well as appropriately balancing multiple injections.

The estimation technique can be applied with increased sample resolution to improve accuracy or be applied with relatively low resolution for less demanding signal processing and convenience for crank angle encoder hardware.

The method described herein is applicable for broad ranges of temperature, cylinder charge and timings associated with compression ignition engines, without requiring calibrated pressure sensors. The method is applicable to spark-ignition engines, including those using homogeneous charge compression ignition strategies. The method is applicable to systems utilizing multiple fuel injection events per cylinder event.

Figure 5:
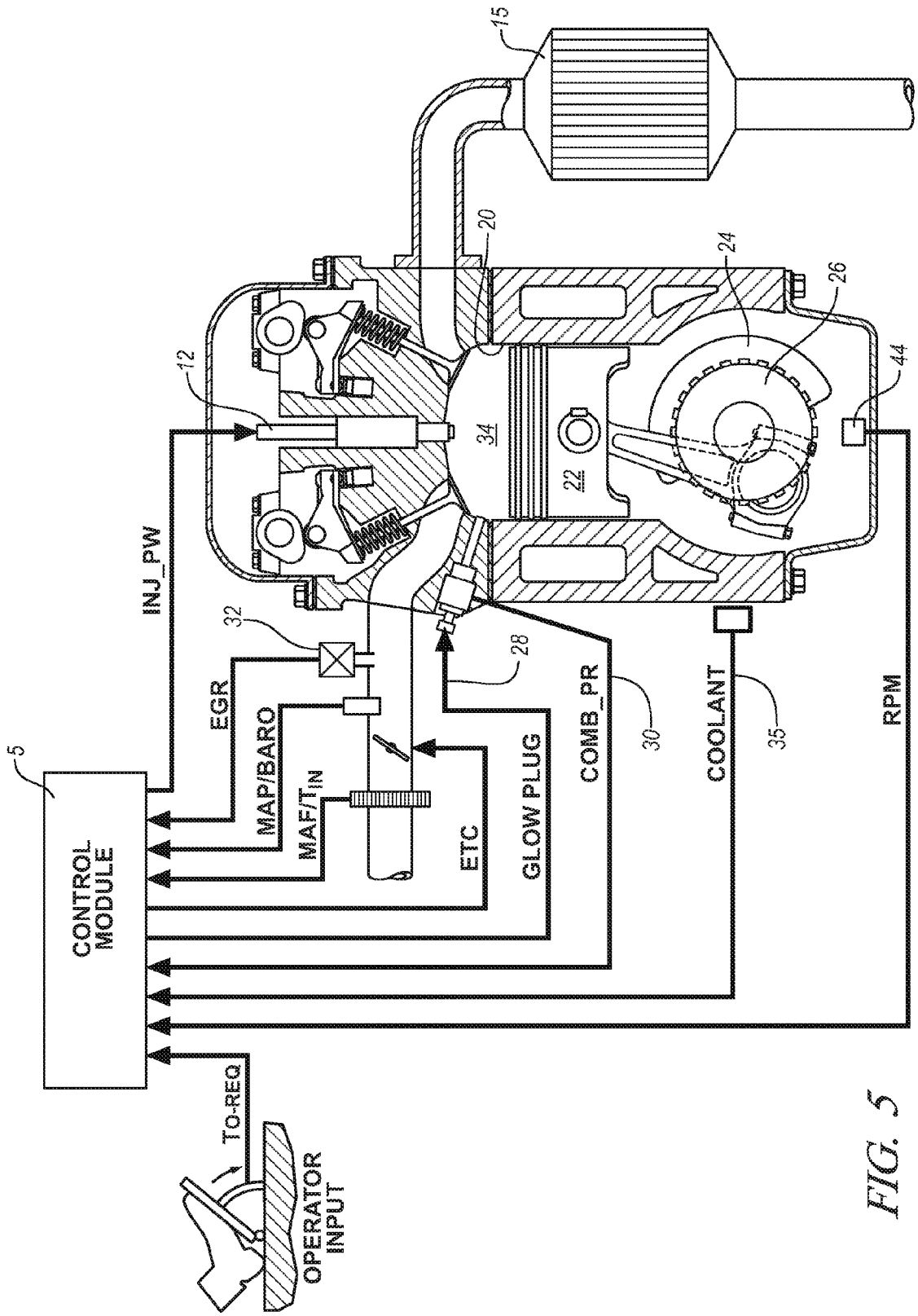
FIG. 5 is a schematic drawing of an engine, in accordance with the present invention.

Referring now to FIG. 5, there is provided a schematic diagram depicting an internal combustion engine 10 and control module 5, and exhaust aftertreatment system 15, constructed in accordance with an embodiment of the present invention. The exemplary engine comprises a multi-cylinder, direct-injection, compression-ignition internal combustion engine having reciprocating pistons 22 attached to a crankshaft 24 and movable in cylinders 20 which define variable volume combustion chambers 34. The crankshaft 24 is operably attached to a vehicle transmission and driveline to deliver tractive torque thereto, in response to an operator torque request (To_req). The engine preferably employs a four-stroke operation wherein each engine combustion cycle comprises 720 degrees of angular rotation of crankshaft 24 divided into four 180-degree stages of intake-compression-expansion-exhaust, which are descriptive of reciprocating movement of the piston 22 in the engine cylinder 20. A multi-tooth target wheel 26 is attached to the crankshaft and rotates therewith. The engine includes sensing devices to monitor engine operation, and actuators which control engine operation. The sensing devices and actuators are signally or operatively connected to control module 5.

The engine preferably has an air/fuel operating regime that is primarily lean of stoichiometry. The skilled practitioner understands that aspects of the invention are applicable to other engine configurations that operate primarily lean of stoichiometry, e.g., lean-burn spark-ignition engines. During normal operation of the compression-ignition engine, a combustion event occurs during each engine cycle when a fuel charge is injected into the combustion chamber to form, with the intake air, the cylinder charge. The cylinder charge is subsequently combusted by action of compression thereof during the compression stroke.

Sensing devices are installed on or near the engine to monitor physical characteristics and generate signals which are correlatable to engine and ambient parameters. The sensing devices include a crankshaft rotation sensor, comprising a crank sensor 44 for monitoring crankshaft speed (RPM) through sensing edges on the teeth of the multi-tooth target wheel 26. The crank sensor is known, and may comprise, e.g., a Hall-effect sensor, an inductive sensor, or a magnetoresistive sensor. Signal output from the crank sensor 44 (RPM) is input to the control module 5. There is a combustion pressure sensor 30, comprising a pressure sensing device adapted to monitor in-cylinder pressure (comb_pr). The combustion pressure sensor 30 preferably comprises a non-intrusive device comprising a force transducer having an annular cross-section that is adapted to be installed into the cylinder head at an opening for a glow-plug 28. The combustion pressure sensor 30 is installed in conjunction with the glow-plug 28, with combustion pressure mechanically transmitted through the glow-plug to the sensor 30. The output signal, comb_pr, of the sensing element of sensor 30 is proportional to cylinder pressure. The sensing element of sensor 30 comprises a piezoceramic or other device adaptable as such. Other sensing devices preferably include a manifold pressure sensor for monitoring manifold pressure (MAP) and ambient barometric pressure (BARO), a mass air flow sensor for monitoring intake mass air flow (MAF) and intake air temperature (Tin), and, a coolant sensor 35 (COOLANT). The system may include an exhaust gas sensor (not shown) for monitoring states of one or more exhaust gas parameters, e.g., temperature, air/fuel ratio, and constituents. One skilled in the art understands that there may other sensing devices and methods for purposes of control and diagnostics. The operator input, in the form of the operator torque request, To_req, is typically obtained through a throttle pedal and a brake pedal, among other devices. The engine is preferably equipped with other sensors (not shown) for monitoring operation and for purposes of system control. Each of the sensing devices is signally connected to the control module 5 to provide signal information which is transformed by the control module to information representative of the respective monitored parameter. It is understood that this configuration is illustrative, not restrictive, including the various sensing devices being replaceable with functionally equivalent devices and algorithms and still fall within the scope of the invention.

The actuators are installed on the engine and controlled by the control module 5 in response to operator inputs to achieve various performance goals. Actuators include an electronically-controlled throttle device which controls throttle opening to a commanded input (ETC), and a plurality of fuel injectors 12 for directly injecting fuel into each of the combustion chambers in response to a commanded input (INJ_PW), all of which are controlled in response to the operator torque request (To_req). There is an exhaust gas recirculation valve 32 and cooler (not shown), which controls flow of externally recirculated exhaust gas to the engine intake, in response to a control signal (EGR) from the control module. The glow-plug 28 comprises a known device, installed in each of the combustion chambers, adapted for use with the combustion pressure sensor 30.

The fuel injector 12 is an element of a fuel injection system, which comprises a plurality of high-pressure fuel injector devices each adapted to directly inject a fuel charge, comprising a mass of fuel, into one of the combustion chambers in response to the command signal, INJ_PW, from the control module. Each of the fuel injectors 12 are supplied pressurized fuel from a fuel distribution system (not shown), and have operating characteristics including a minimum pulsewidth and an associated minimum controllable fuel flow rate, and a maximum fuel flowrate.

The engine may be equipped with a controllable valvetrain operative to adjust openings and closings of intake and exhaust valves of each of the cylinders, including any one or more of valve timing, phasing (i.e., timing relative to crank angle and piston position), and magnitude of lift of valve openings. One exemplary system includes variable cam phasing, which is applicable to compression-ignition engines, spark-ignition engines, and homogeneous-charge compression ignition engines.

The control module 5 is preferably a general-purpose digital computer generally comprising a microprocessor or central processing unit, storage mediums comprising non-volatile memory including read only memory (ROM) and electrically programmable read only memory (EPROM), random access memory (RAM), a high speed clock, analog to digital (A/D) and digital to analog (D/A) circuitry, and input/output circuitry and devices (I/O) and appropriate signal conditioning and buffer circuitry. The control module has a set of control algorithms, comprising resident program instructions and calibrations stored in the non-volatile memory and executed to provide the respective functions of each computer. The algorithms are typically executed during preset loop cycles such that each algorithm is executed at least once each loop cycle. Algorithms are executed by the central processing unit and are operable to monitor inputs from the aforementioned sensing devices and execute control and diagnostic routines to control operation of the actuators, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event. Event-based algorithms and engine operation include pressure monitoring from the combustion sensor 30, wherein measurements are taken corresponding to each tooth passing on the crank wheel 26. Thus, when the crank wheel comprises a 60X-2X wheel, combustion sensing occurs each six degrees of crankshaft rotation, with one tooth and measurement corresponding to crank setting at 0 TDC for each piston.

The control module 5 executes algorithmic code stored therein to control the aforementioned actuators to control engine operation, including throttle position, fuel injection mass and timing, EGR valve position to control flow of recirculated exhaust gases, glow-plug operation, and control of intake and/or exhaust valve timing, phasing, and lift, on systems so equipped. The control module is adapted to receive input signals from the operator (e.g., a throttle pedal position and a brake pedal position) to determine the operator torque request, To_req, and from the sensors indicating the engine speed (RPM) and intake air temperature (Tin), and coolant temperature and other ambient conditions.

The control module is adapted to monitor cylinder pressures and engine operating conditions from the aforementioned sensors, preferably and execute program code to determine the combustion phasing and heat release, as previously described. The control module 5 acts to determines instantaneous control settings for fuel injection mass and timing, EGR valve position, and, intake and exhaust valve phasing and lift set points, and other control parameters, from lookup tables and control schemes executed as program code in one of the memory devices. With the combustion sensing occurring each six degrees of elapsed crankshaft rotation, the control module executes code generated based upon Eqs. 1-34 to measure pressure ratios, determine combustion heat, and estimate the mass of fuel burned for each elapsed rotation of the crankshaft.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The invention claimed is:

1. Method to operate an internal combustion engine, said engine comprising a multi-cylinder direct-injection engine operative lean of stoichiometry; each cylinder including a variable volume combustion chamber defined by a piston reciprocating therein between top-dead-center and bottom-dead-center points and a cylinder head; the piston reciprocating in repetitive cycles each cycle comprising intake, compression, expansion, and exhaust strokes, the method comprising:

adapting a plurality of pressure sensing devices to monitor in-cylinder pressure during ongoing engine operation;

monitoring in-cylinder pressure and a corresponding engine crank position to periodically to determine instantaneous in-cylinder pressure states corresponding to the engine crank position during the compression and expansion strokes;

determining a plurality of pressure ratios based upon the instantaneous in-cylinder pressure states; and, determining a combustion heat release based upon the plurality of pressure ratios.

2. The method of claim 1, further comprising determining a combustion heat release for each cycle for each cylinder based upon the plurality of pressure ratios.

3. The method of claim 1, wherein determining the combustion heat release for each cycle for each cylinder based upon the plurality of pressure ratios further comprises determining combustion heat release for a portion of each cycle for each cylinder based upon the plurality of pressure ratios.

4. The method of claim 3, wherein determining the combustion heat release for a portion of each cycle comprises determining a combustion heat release resulting from a first fuel injection event.

5. The method of claim 3, wherein determining the combustion heat release for a portion of each cycle comprises determining a combustion heat release resulting from first and second fuel injection events.

6. The method of claim 3, wherein determining the combustion heat release for a portion of each cycle comprises determining a combustion heat release resulting from first, second, and third fuel injection events.

7. The method of claim 2, wherein determining the combustion heat release for each cycle for each cylinder based upon the plurality of pressure ratios further comprises determining the heat release based upon a constant volume heat addition and a polytropic expansion.

8. The method of claim 1, wherein determining combustion heat release for each cycle for each cylinder based upon the plurality of pressure ratios further comprises determining a combustion phasing relative to engine crank angle.

9. Method to operate an engine, said engine comprising a direct-injection, four-stroke, internal combustion engine including a variable volume combustion chamber defined by a piston reciprocating within a cylinder between top-dead-center and bottom-dead-center points and a cylinder head; the piston reciprocating in repetitive cycles each cycle comprising intake, compression, expansion, and exhaust strokes, the method comprising:

operating the engine lean of stoichiometry;

adapting a plurality of pressure sensing devices to monitor in-cylinder pressure and a corresponding engine crank position during ongoing operation;

determining a plurality of instantaneous in-cylinder pressure states corresponding to the engine crank position during the compression and expansion strokes;

determining a plurality of pressure ratios based upon the instantaneous in-cylinder pressure states; and, determining a combustion heat release for each cycle for each cylinder based upon the plurality of pressure ratios.

10. The method of claim 9, wherein determining combustion heat release for each cycle for each cylinder based upon the plurality of pressure ratios further comprises determining combustion heat release for a portion of each cycle for each cylinder based upon the plurality of pressure ratios.

11. The method of claim 10, wherein the combustion heat release for a portion of each cycle comprises combustion heat release due to a first fuel injection event.

12. The method of claim 10, wherein the combustion heat release for a portion of each cycle comprises heat release due to first and second fuel injection events.

13. The method of claim 10, wherein the combustion heat release for a portion of each cycle comprises heat release due to first, second, and third fuel injection events.

14. The method of claim 10, wherein determining combustion heat release for each cycle for each cylinder based upon the plurality of pressure ratios further comprises determining the heat release based upon a constant volume heat addition and a polytropic expansion.

15. The method of claim 10, wherein determining combustion heat release for each cycle for each cylinder based upon the plurality of pressure ratios further comprises determining a combustion phasing relative to engine crank angle.

16. Method to monitor engine operation, said engine comprising a direct-injection, four-stroke, internal combustion engine including a variable volume combustion chamber defined by a piston reciprocating within a cylinder between top-dead-center and bottom-dead-center points and a cylinder head; the piston reciprocating in repetitive cycles each cycle comprising intake, compression, expansion, and exhaust strokes, the method comprising:

adapting a pressure sensing device to monitor in-cylinder pressure corresponding to engine crank position during ongoing operation;

determining instantaneous in-cylinder pressure states corresponding to the engine crank position during the compression and expansion strokes;

determining a cylinder pressure ratio at an engine crank angle based upon the instantaneous in-cylinder pressure states;

determining a combustion heat release based upon the pressure ratios;

and, estimating a mass of fuel burned in the cylinder based upon the combustion heat release.

17. The method of claim 16, further comprising estimating the mass of fuel burned based upon the combustion heat release for an elapsed crank angle rotation.

18. The method of claim 16, wherein determining the combustion heat release based upon the plurality of pressure ratios further comprises determining the heat release based upon a constant volume heat addition and a polytropic expansion.

19. The method of claim 16, wherein estimating a mass of fuel burned in the cylinder based upon the combustion heat release comprises estimating the mass of fuel burned in the cylinder subsequent to first, second, and third fuel injection events.

20. The method of claim 16, wherein adapting a pressure sensing device to monitor in-cylinder pressure corresponding to engine crank position during ongoing operation comprises adapting a non-intrusive pressure sensing device having a signal output proportional to cylinder pressure.

* * * * *